United States Patent [19]

Hoffman

[11] Patent Number: 5,894,335
[45] Date of Patent: Apr. 13, 1999

[54] REMOVABLE SUN PROTECTIVE LENSES FOR EYEGLASSES

[76] Inventor: James C. Hoffman, 6 Mil Creek Rd. Box 204A7, Edmeston, N.Y. 13335

[21] Appl. No.: 08/929,289

[22] Filed: Sep. 8, 1997

[51] Int. Cl.⁶ .............................. G02C 7/10; G02C 9/04
[52] U.S. Cl. .................................. 351/47; 351/41
[58] Field of Search ........................ 351/41, 47, 48, 351/123, 158

[56] References Cited

U.S. PATENT DOCUMENTS 5,321,443  6/1994  Huber et al. .......................... 351/47
5,519,460  5/1996  Mills ................................... 351/47

*Primary Examiner*—Scott J. Sugarman

[57] ABSTRACT

Removable sun protective lenses for eyeglasses. The glasses have a pair of prescription lenses coupled at the inboard ends thereof and also have outboard ends, each with a linear ear piece coupled thereto. A pair of sun protective lenses are coupled at inboard ends and have a pair of linear arms coupled to outboard ends of the sun protective lenses. The sun protective lenses are mounted to the glasses with a bottom surface of the linear arms resting on a top surface of the ear pieces of the glasses. Coupling components are provided for removably coupling the linear arms of the sun protective lenses and the ear pieces of the glasses.

7 Claims, 2 Drawing Sheets

REMOVABLE SUN PROTECTIVE LENSES FOR EYEGLASSES

BACKGROUND OF THE INVENTION

1. Field of the Invention

The present invention relates to removable sun protective lenses for eyeglasses and more particularly pertains to removably coupling a pair of sun protective lenses to eyeglasses in a convenient manner.

2. Description of the Prior Art

The use of clip-on sunglasses is known in the prior art. More specifically, clip-on sunglasses heretofore devised and utilized for the purpose of protecting eyes of a user are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,247,178; U.S. Pat. No. 5,321,443; U.S. Pat. No. 5,398,947; U.S. Pat. No. 5,390,969; and U.S. Pat. No. Des. 349,758.

In this respect, the removable sun protective lenses for eyeglasses according to the present invention substantially departs from the conventional concepts and designs of the prior art, and in so doing provides an apparatus primarily developed for the purpose of removably coupling a pair of sun protective lenses to eyeglasses in a convenient manner.

Therefore, it can be appreciated that there exists a continuing need for a new and improved removable sun protective lenses for eyeglasses which can be used for removably coupling a pair of sun protective lenses to eyeglasses in a convenient manner. In this regard, the present invention substantially fulfills this need.

SUMMARY OF THE INVENTION

In view of the foregoing disadvantages inherent in the known types of clip-on sunglasses now present in the prior art, the present invention provides an improved removable sun protective lenses for eyeglasses. As such, the general purpose of the present invention, which will be described subsequently in greater detail, is to provide a new and improved removable sun protective lenses for eyeglasses which has all the advantages of the prior art and none of the disadvantages.

To attain this, the present invention essentially comprises a pair of generally circular prescription lenses coupled at inboard ends thereof. The pair of glasses include front faces which are flat and in coplanar relationship. Outboard ends of the glasses are each equipped with a linear ear piece hingably coupled thereto. The ear pieces are adapted to pivot about a vertical axis. Each linear ear piece has an end with an arcuate ear engagement portion having an elastomeric covering. As shown in FIG. 1, a pair of vertically oriented apertures are formed completely through the linear ear pieces of the glasses. The apertures are situated a distance from a first end of the ear pieces equal to about ⅓ a length of the linear ear piece. Next provided is a pair of sun protective lenses coupled at inboard ends having flat coplanar rear faces. Each sun protective lens has a surface area equal to that of each lens of the glasses. A pair of linear arms are coupled at first ends thereof to outboard ends of the sun protective lenses. Each linear arm has a length of about ⅓ that of the linear ear pieces of the pair of glasses. A pair of coupling posts each have an upper cylindrical extend coupled to a bottom of an associated one of the linear arms adjacent a second end thereof, as shown in FIG. 1. Shown in FIG. 2 is a lower extent of the coupling post with a coupling mechanism formed thereon. The coupling mechanism has an upright frusto-conical top portion with a first height, an intermediate cylindrical portion, and an inverted frusto-conical bottom portion with a second height twice that first height. Each coupling post further has a pair of vertically oriented perpendicular slits formed in the entire lower extent and a portion of the upper extent thereof. By this structure, the sun protective lenses is adapted to be mounted to the glasses with rear faces of the sun protective lenses abutting the front faces of the glasses. Further when mounted, the coupling mechanisms extend through the apertures formed in the glasses and reside below the linear ear pieces and a bottom surface of the linear arms of the protective lenses resting on a top surface of the ear pieces of the glasses. Finally, a pair of elastomeric retainers are provided each having a smooth cylindrical outer surface. An interior surface of each retainer has an upper inverted frusto-conical extent and a top intermediate extent with a cylindrical configuration having a first diameter. As shown in FIG. 4, the interior surface further has a bottom intermediate extent with an upright frusto-conical configuration and a bottom cylindrical extent with a second diameter greater than the first diameter. During use, the elastomeric retainer is adapted to engage the coupling mechanism to retain the sun protective lenses in its mounted position on the glasses.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved removable sun protective lenses for eyeglasses which has all the advantages of the prior art clip-on sunglasses and none of the disadvantages.

It is another object of the present invention to provide a new and improved removable sun protective lenses for eyeglasses which may be easily and efficiently manufactured and marketed.

It is a further object of the present invention to provide a new and improved removable sun protective lenses for eyeglasses which is of a durable and reliable construction.

An even further object of the present invention is to provide a new and improved removable sun protective lenses for eyeglasses which is susceptible of a low cost of manufacture with regard to both materials and labor, and which accordingly is then susceptible of low prices of sale to the consuming public, thereby making such removable sun protective lenses for eyeglasses economically available to the buying public.

Still yet another object of the present invention is to provide a new and improved removable sun protective lenses for eyeglasses which provides in the apparatuses and methods of the prior art some of the advantages thereof, while simultaneously overcoming some of the disadvantages normally associated therewith.

Still another object of the present invention is to removably couple a pair of sun protective lenses to eyeglasses in a convenient manner.

Lastly, it is an object of the present invention to provide a new and improved removable sun protective lenses for eyeglasses including glasses having a pair of prescription lenses coupled at inboard ends thereof. Outboard ends of the glasses each has a linear ear piece coupled thereto. A pair of sun protective lenses are coupled at inboard ends similar to the glasses. The sun protective lenses and the glasses are coupled by way of a post and an aperture.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
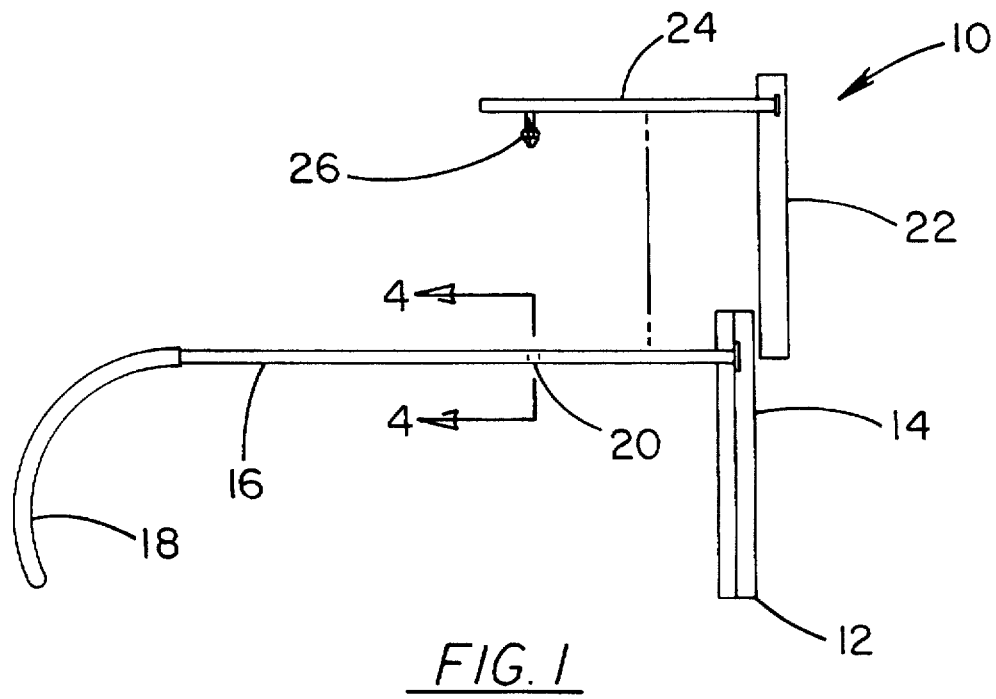
FIG. 1 s a perspective illustration of the preferred embodiment of the removable sun protective lenses for eyeglasses constructed in accordance with the principles of the present invention.

With reference now to the drawings, and in particular to FIG. 1 thereof, a new and improved removable sun protective lenses for eyeglasses embodying the principles and concepts of the present invention and generally designated by the reference numeral 10 will be described.

The present invention, the new and improved removable sun protective lenses for eyeglasses, is comprised of a plurality of components. Such components in their broadest context include glasses, sun protective lenses, and a retainer. Such components are individually configured and correlated with respect to each other so as to attain the desired objective.

More specifically, it will be noted that the system 10 of the present invention includes glasses 12 having a pair of generally circular prescription lenses 14 coupled at inboard ends thereof. Since the glasses are prescription, they are transparent and alter the vision of a user when worn. The pair of glasses include front faces which are flat and in coplanar relationship. Outboard ends of the glasses are each equipped with a linear ear piece 16 hingably coupled thereto. The ear pieces are adapted to pivot about a vertical axis. Each linear ear piece has an end with an arcuate ear engagement portion 18 having an elastomeric covering.

As shown in FIG. 1, a pair of vertically oriented apertures 20 are formed completely through the linear ear pieces of the glasses. The apertures are situated a distance from a first end of the ear pieces equal to about ⅕ a length of the linear ear piece.

Next provided is a pair of sun protective lenses 22 coupled at inboard ends and having flat coplanar rear faces. Each sun protective lens has a surface area equal to that of each lens of the glasses. A pair of rigid linear arms 24 are either fixedly or hingably coupled at first ends thereof to outboard ends of the sun protective lenses. Each linear arm has a length about ⅕ that of the linear ear pieces of the pair of glasses and has a thickness of no more that twice thereof.

Figure 2:
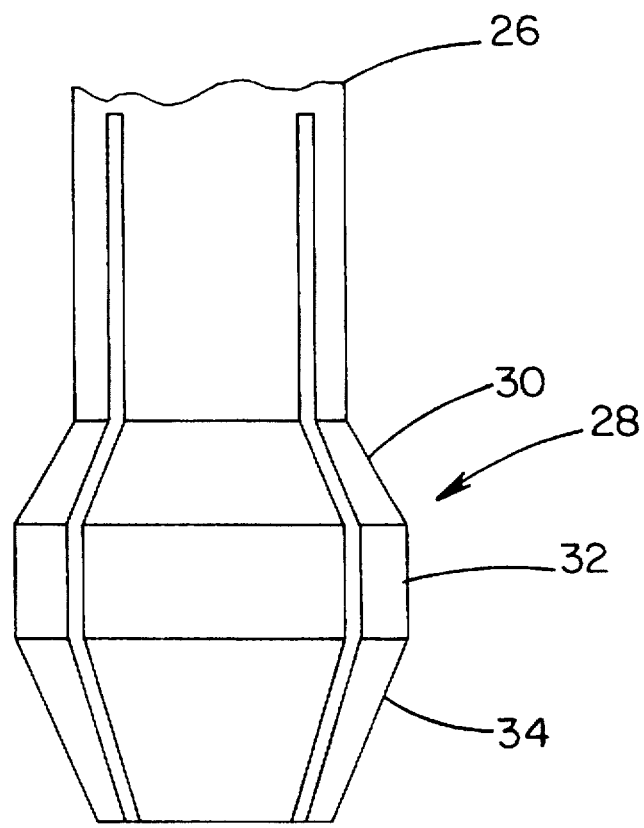
FIG. 2 is a close-up view of the coupling post of the present invention.
Figure 3:
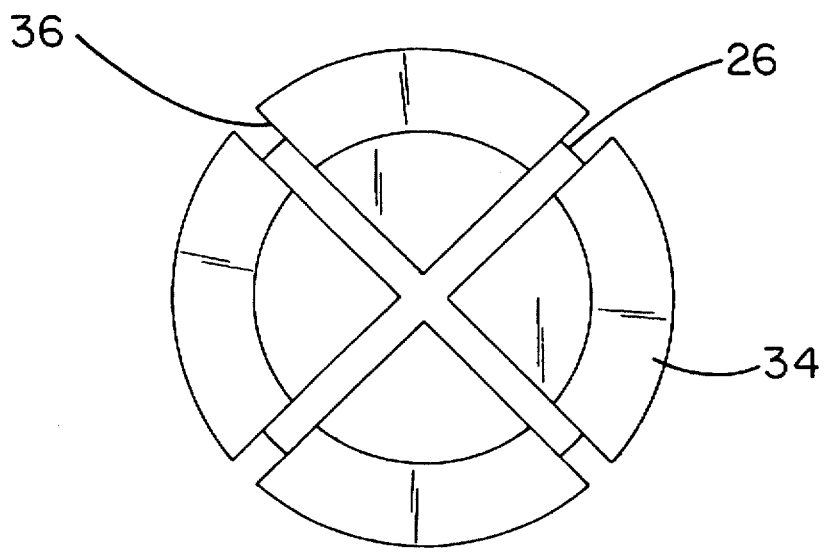
FIG. 3 is a bottom view of the coupling post of the present invention.

A pair of coupling posts 26 each have an upper cylindrical extent coupled to a bottom of an associated one of the linear arms adjacent a second end thereof, as shown in FIG. 1. The length of the posts is less than 1/10 that of the linear arms. Shown in FIG. 2 is a lower extent of the coupling post with a coupling mechanism 28 formed thereon. The coupling mechanism has an upright frusto-conical top portion 30 with a first height, an intermediate cylindrical portion 32, and an inverted frusto-conical bottom portion 34 with a second height twice that first height. Each coupling post further has a pair of vertically oriented perpendicular slits 36 formed in the entire lower extent and a portion of the upper extent thereof. The coupling post thus defines a resilient collapsible collet with a length of about 7 mm and a diameter of between 2 mm and 3 mm.

By this structure, the sun protective lenses is adapted to be mounted to the glasses with rear faces of the sun protective lenses abutting the front faces of the glasses. Further when mounted, the coupling mechanisms extend through the apertures formed in the glasses and reside below the linear ear pieces and a bottom surface of the linear arms of the protective lenses rest on an entire top surface of the ear pieces of the glasses.

Figure 4:
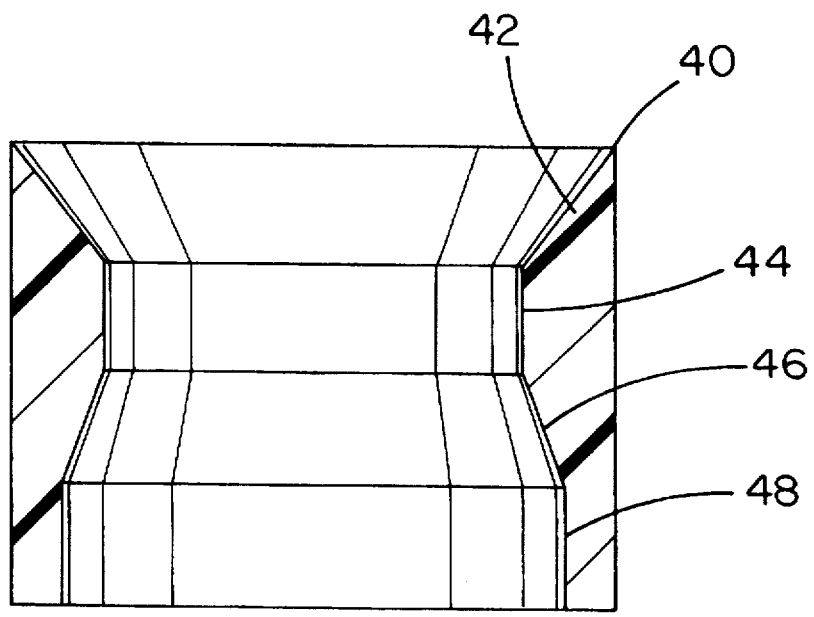
FIG. 4 is a cross-sectional view of the retainer of the present invention taken along line 4—4 shown in FIG. 1.

Finally, a pair of elastomeric retainers 40 are provided each having a smooth cylindrical outer surface. An interior surface of each retainer has an upper inverted frusto-conical extent 42 and a top intermediate extent 44 with a cylindrical configuration having a first diameter. As shown in FIG. 4, the interior surface further has a bottom intermediate extent 46 with an upright frusto-conical configuration and a bottom cylindrical extent 48 with a second diameter greater than the first diameter. During use, the elastomeric retainer is adapted to engage the coupling mechanism to retain the sun protective lenses in its mounted position on the glasses.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved removable sun protective lenses for eyeglasses comprising, in combination:

glasses having a pair of generally circular prescription lenses coupled at inboard ends thereof, the pair of glasses including front faces which are flat and in coplanar relationship and outboard ends each with a first end of a linear ear piece hingably coupled thereto with the ear pieces adapted to pivot about a vertical axis, each linear ear piece having a second end with an arcuate ear engagement portion having an elastomeric covering;

a pair of vertically oriented apertures formed completely through the linear ear pieces of the glasses and situated a distance from the first end thereof equal to about ⅓ a length of the linear ear piece;

a pair of sun protective lenses coupled at inboard ends and having flat coplanar rear faces, each sun protective lens having a surface area equal to that of each lens of the glasses, a pair of linear arms each with a length of about ⅓ that of the linear ear pieces of the pair of glasses with the linear arms coupled at first ends thereof to outboard ends of the sun protective lenses, and a pair of coupling posts each having an upper cylindrical extent coupled to a bottom of an associated one of the linear arms adjacent a second end thereof and a lower extent with a coupling mechanism formed thereon, the coupling mechanism having an upright frusto-conical top portion with a first height, an intermediate cylindrical portion, and an inverted frusto-conical bottom portion with a second height twice the first height, each coupling post having a pair of vertically oriented perpendicular slits formed in the entire lower extent and a portion of the upper extent thereof, the sun protective lenses adapted to be mounted to the glasses with rear faces of the sun protective lenses abutting the front faces of the glasses, the coupling mechanisms extending through the apertures formed in the glasses and residing below the linear ear pieces, and a bottom surface of the linear arms of the protective lenses resting on a top surface of the ear pieces of the glasses; and a pair of elastomeric retainers each having a smooth cylindrical outer surface and an interior surface having an upper inverted frusto-conical extent, a top intermediate extent with a cylindrical configuration having a first diameter, a bottom intermediate extent with an upright frusto-conical configuration, and a bottom cylindrical extent with a second diameter greater than the first diameter, whereby the elastomeric retainer is adapted to engage the coupling mechanism to retain the sun protective lenses in its mounted position on the glasses.

2. Removable sun protective lenses for eyeglasses comprising:

glasses having a pair of prescription lenses coupled at inboard ends thereof and having outboard ends each with a linear ear piece coupled thereto;

a pair of sun protective lenses coupled at inboard ends and having a pair of linear arms coupled to outboard ends of the sun protective lenses, the sun protective lenses mounted to the glasses with a bottom surface of the linear arms resting on a top surface of the ear pieces of the glasses; and coupling means for removably coupling the linear arms of the sun protective lenses and the ear pieces of the glasses.

3. Removable sun protective lenses for eyeglasses as set forth in claim 2 wherein the coupling means includes a pair of apertures formed in the ear pieces and a post formed on each of the linear arms.

4. Removable sun protective lenses for eyeglasses as set forth in claim 3 and further including a retainer for securing the posts within the aperture.

5. Removable sun protective lenses for eyeglasses as set forth in claim 4 wherein the posts has at least one frusto-conical extent formed thereon and the retainer has at least one frusto-conical extent formed therein.

6. Removable sun protective lenses for eyeglasses as set forth in claim 3 wherein the posts has at least one slit formed therein.

7. Removable sun protective lenses for eyeglasses as set forth in claim 2 wherein the glasses includes front faces which are flat and in coplanar relationship and the sun protective lenses have flat coplanar rear faces.

\* \* \* \* \*